US005112372A

United States Patent [19]

Boeckermann et al.

[11] Patent Number: 5,112,372

[45] Date of Patent: May 12, 1992

[54] ADVANCED DISPOSABLE AIR CLEANER

[75] Inventors: Thomas A. Boeckermann, Lakeville; Larry R. Nepsund, Savage; John D. Sandkamp, Minnetonka, all of Minn.

[73] Assignee: Donaldson Company, Inc., Minneapolis, Minn.

[21] Appl. No.: 780,928

[22] Filed: Oct. 22, 1991

[51] Int. Cl.[5] ........................ B01D 46/00; B01D 50/00

[52] U.S. Cl. ........................................ 55/276; 55/492; 55/498; 55/502; 55/505; 55/510; 181/558

[58] Field of Search ................ 55/276, 492, 498, 502, 55/505, 510, 521; 181/231, 238, 258

[56] References Cited

U.S. PATENT DOCUMENTS

| | | | |
|---|---|---|---|
| 3,137,553 | 6/1964 | Billey . | |
| 3,419,892 | 12/1968 | Wagner et al. . | |
| 3,672,464 | 6/1972 | Rowley et al. . | |
| 4,122,914 | 10/1978 | Suyama | 181/258 |
| 4,227,899 | 10/1980 | Kamekawa et al. | 55/276 |
| 4,267,899 | 5/1981 | Wagner et al. . | |
| 4,325,460 | 4/1982 | Hoppenstedt . | |
| 4,350,509 | 9/1982 | Alseth et al. . | |
| 4,353,434 | 10/1982 | Norris | 181/258 |
| 4,359,135 | 11/1982 | Wagner et al. . | |
| 4,368,799 | 1/1983 | Wagner . | |
| 4,580,657 | 4/1986 | Schmeichel et al. . | |
| 4,632,216 | 12/1986 | Wagner et al. . | |
| 4,969,537 | 11/1990 | Wagner et al. . | |

*Primary Examiner*—Charles Hart

*Attorney, Agent, or Firm*—Merchant, Gould, Smith, Edell, Welter & Schmidt

[57] ABSTRACT

An air cleaner with an integrated nozzle element comprised of a perforated portion at one end, a generally centrally located throat and a noise suppressing portion from the second end to the throat. The nozzle element is located within the inner opening of the air cleaner's tubular filter element. The perforated portion is arranged and configured to be the same size and shape as the inner opening to provide support for the tubular filter element. the throat is arranged and configured to provide the required restriction to create a specified negative engine crankcase pressure, and the noise suppressing portion is arranged and configured to provide the required attenuation of engine intake noise passing through the air cleaner.

14 Claims, 1 Drawing Sheet

ADVANCED DISPOSABLE AIR CLEANER

TECHNICAL FIELD OF INVENTION

This invention is directed generally to the field of disposable air cleaners, and specifically to disposable cleaners that provide a negative engine crankcase pressure, support for the filter element, and attenuation of intake noise from the engine.

BACKGROUND OF THE INVENTION

Traditionally, disposable engine air cleaners perform primarily the function of preventing dirt and other particles from entering the engine air intake. Usually, an air cleaner is attached to an engine intake tube and air enters the cleaner where it passes through a porous media filter before entering the engine intake tube. An example of such an air cleaner is the disposable air cleaner shown and described in the Alseth et al. U.S. Pat. No. 4,350,509, issued Sep. 21, 1982.

Three problems can arise from the use of current air cleaners. In some cases, to reduce cost, a pleated porous media filter is used without an internal support. Because non-woven, porous media filters are subject to collapse if not fully supported, media particles can enter the engine intake if the media does collapse. Second, some engines require a specific amount of negative pressure to assure adequate crankcase ventilation. Current cleaners are not designed to provide a specific level of negative pressure. Third, some engine noise can travel from the intake, back through the cleaner, without being properly attenuated.

SUMMARY OF THE INVENTION

The present invention is directed at an improved air cleaner that incorporates an integrated tubular nozzle element to solve these problems. This nozzle element is positioned within the inner opening of the air cleaner's filter element and is comprised of three sections.

First, a perforated portion is located at one end. The perforations are sized and spaced to prevent the ingestion of filter media particles in the event of a filter element collapse. Moreover, the perforated portion is preferably arranged and configured to be the same size and shape as the inner opening of the filter element to provide filter element support and reduce the chance of collapse.

Second, an imperforate generally centrally located portion converges from the perforated portion to a throat. The throat is sized to create a restriction sufficient to produce the negative crankcase pressure required by the engine in use.

Third, an imperforate noise suppressing portion is located at the second end and converges from the nozzle outlet at said second end to the throat. The size of the outlet and length of the noise suppressing portion can be arranged and configured to cooperate with the throat to attenuate the engine noise traveling from the engine through the air cleaner.

Therefore, the integration of the nozzle element into existing disposable air cleaner designs solves the three problems described above that can arise with the use of current air cleaners. The nozzle simultaneously supports the filter and prevents the ingestion of filter media particles, it provides the necessary restriction to create a specified negative crankcase pressure and it attenuates engine intake noise passing through the air cleaner.

Thus, there have been outlined rather broadly the more important features of the invention in order that the detailed description thereof as follows may be better understood and in order that the present contribution to the art may be better appreciated. There are, of course, additional features of the invention that will be detailed hereinafter and will form the subject of the claims appended hereto. Those skilled in the art will appreciate that the conception upon which the disclosure is based may readily be utilized as the basis for the designing of other structures. It is important, therefore, that the claims be regarded as including such equivalent structures as do not depart from the spirit and scope of the invention.

BRIEF DESCRIPTION OF THE DRAWINGS

The specific embodiment of the invention has been chosen for the purpose of illustration and description and is shown in the accompanying drawings forming part of the specification wherein.

DESCRIPTION OF THE PREFERRED EMBODIMENT

Figure 1:
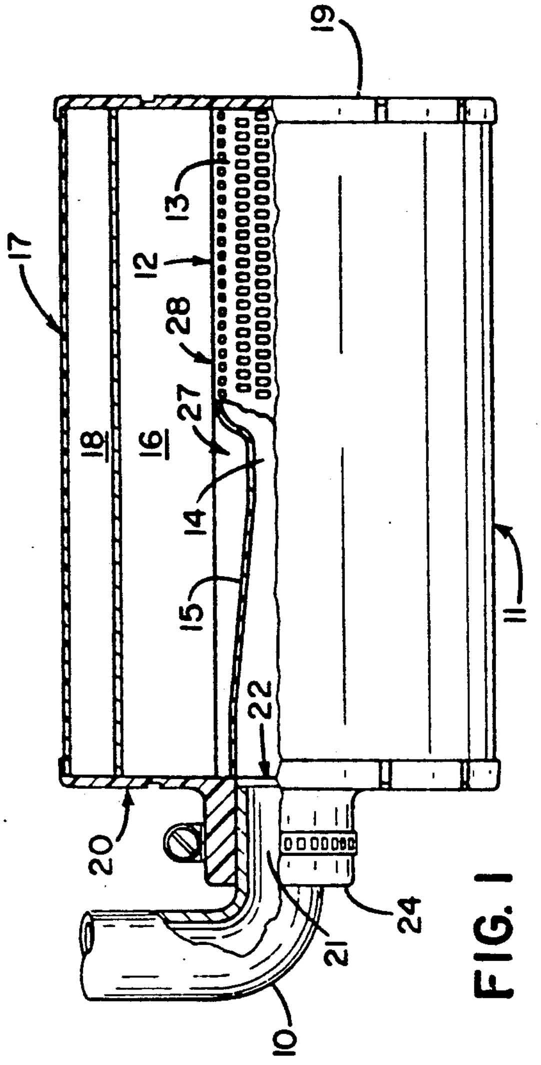
FIG. 1 is a side elevation of the preferred embodiment of the air cleaner with portions broken away and portions shown in section.
Figure 2:
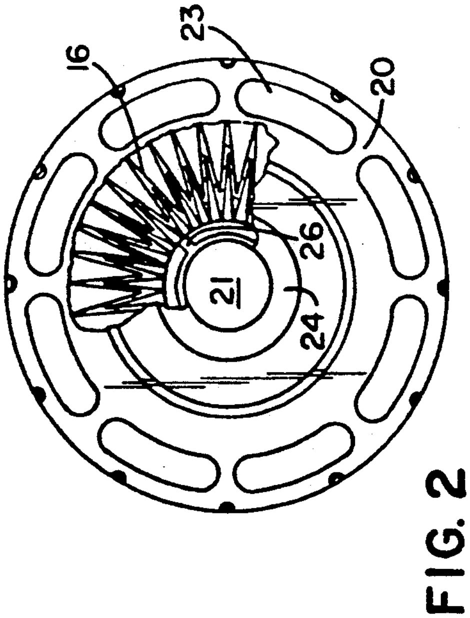
FIG. 2 is a view of the outlet end of the preferred embodiment with portions broken away.

In FIG. 1, there can be seen an air cleaner 11 having a tubular nozzle element 12, comprised of a perforated screen-like portion 13, an imperforate portion 13*a* converging to a throat 14, and an imperforate noise suppressing portion 15 converging from a generally circular nozzle element outlet 22 to throat 14.

Figure 3:
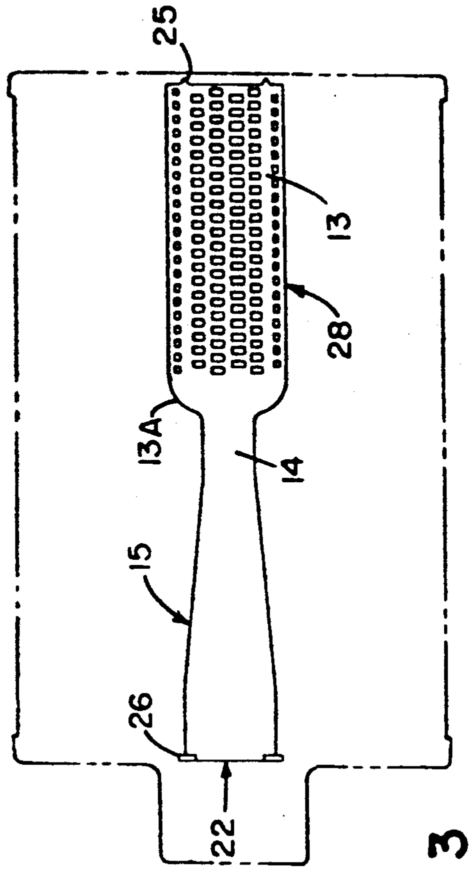
FIG. 3 is a shadow drawing of the air cleaner showing a side elevation of the preferred embodiment of the nozzle element.

Coaxially aligned with tubular nozzle element 12 is a generally cylindrical tubular filter element 16 shown more clearly in FIG. 3 as a pleated element preferably made of a flexible, non-woven material and having an inner opening 27. A generally cylindrical outer shell 17 is similarly coaxially aligned with tubular nozzle element 12 and tubular filter element 16 to create a defined air intake space 18 between outer shell 17 and tubular filter element 16.

Acting as an air seal and structural end member, is first end cap 19 which forms an air-tight junction with outer shell 17, tubular filter element 16, and tubular nozzle element 12 at one end of its perforated portion 13. Although the end caps may be formed of any suitable light-weight material, a molded urethane material of 90 shore A durometer, which is fairly rigid but flexible enough to maintain an adequate seal, is preferred.

The second end cap 20 is formed in a similar fashion to that of first end cap 19 and creates an air-tight seal between the cylindrical shell 17, tubular filter element 16 and tubular nozzle element 12 at nozzle element outlet 22. To permit air to exit the nozzle element outlet 22, second end cap 20 includes a circular aperture 21 of equal size to and aligned with nozzle element outlet 22.

Extending outwardly from second end cap 20 generally at aperture 21 is a generally cylindrical tubular flange 24 which is preferably molded as a single piece with second end cap 20. In the preferred embodiment, tubular flange 24 would be made from a flexible material and would be fit over the engine intake tube 10. Compression or securing means would be applied to tubular flange 24 to form an air-tight seal with intake tube 10.

To provide a source of intake air for air cleaner 11 at least one aperture is formed in one of the end caps. Preferably, a plurality of curved slots 23 are located in second end cap 20 as to allow air to enter within space 18.

Perforated portion 13 is a screen-like portion which is generally cylindrical, and is sized to have an outside diameter 28 equal to the diameter of tubular filter element 16 inner opening 27 and a length of approximately 4.6 inches, which is slightly less than half the length of said nozzle element, to enable perforated portion 13 to act as a support structure for tubular filter element 16. The perforations in perforated portion 13 are also arranged and configured to prevent any pieces of damaged tubular filter element 16 from entering tubular nozzle element 12. Prior experience demonstrates that pieces from a damaged filter element are usually large enough that closely spaced rectangular perforations of approximately 0.20 inches by 0.10 inches are adequate to prevent damaged filter pieces from entering tubular nozzle element 12.

During operation, air is drawn into air cleaner 11 through curved slots 23 in second end cap 20 and into space 18 defined between outer shell 17 and tubular filter element 16. The air is then drawn through tubular filter element 16, removing dirt and other particles from the air, and then into tubular nozzle element 12 by way of the perforations in perforated portion 13. The clean air then passes through throat 14 and noise suppressing portion 15, then out nozzle outlet 22 and into engine intake tube 10.

The preferred embodiment of the air cleaner 11 was developed for use with an Isuzu 4-cycle, direct injection, 2.2 liter diesel engine. This Isuzu engine can be found in use with semi trailer refrigeration units. This engine requires a minimum negative crankcase pressure of approximately 10.5 inches of water to assure adequate crankcase ventilation and it emits an undesirable engine intake noise frequency between 33–73 hertz.

Throat 14 of tubular nozzle element 12 is generally cylindrical in shape and sized to provide the restriction required to produce a specified negative crankcase pressure, a minimum of 10.5 inches of water for the Isuzu engine. In the preferred embodiment, this requirement results in an inside throat 14 diameter of 0.825 inches and a length of 0.814 inches.

Noise suppressing portion 15 is generally frustaconical in shape and its length and the diameter of nozzle element outlet 22 are arranged and configured to attenuate a specified frequency of inlet noise, 33–73 hertz for the Isuzu engine. This requirement results in an outlet diameter of 1.22 inches and a length of 4.02 inches creating a convergence angle of 5.19 degrees.

The sound waves emanating from the engine would normally be dissipated through the filter element and housing in the absence of the nozzle element. However, because prior art filters do not function well as mufflers, most of the engine noise is not attenuated. In the construction described herein, however, some of the sound waves emanating from the engine are blocked by the converging wall of noise suppressing portion 15 of nozzle element 12 and are prevented from passing directly through throat 14. These sound waves are reflected back because of the increased acoustical impedance of the noise suppressing portion of the nozzle element, thus substantially decreasing the sound level. Some of the reflected sound waves may bounce back but in that case they are likely to be out of phase, resulting in sound wave cancellation. As a result of both the increased acoustical impedance and the cancellation effect, a substantial reduction in noise level is achieved.

To improve assembly and durability, nozzle element 12 is fitted with first end tabs 25 and second end tabs 26. Several first end tabs 25 are located at and extend outward axially from the end of the perforated portion 13. Several second end tabs 26 are located at and extend outward radially from the other end of nozzle element 12 at outlet 22. These tabs are inserted into the mold of the endcaps during their molding process to make the endcaps and tubular nozzle element 12 into a single integrated structure . These tabs, therefore, assure proper placement of tubular nozzle element 12 and increase the resistance to shear forces of the bond between the end caps and tubular nozzle element 12.

While we have shown a preferred embodiment for the Isuzu engine, it will be understood that the general concept is capable of being applied to other engines or to other air cleaner designs without departure from the scope and spirit of the invention as defined in the claims.

What is claimed is:

1. An air cleaner for use with a rigid engine air intake tube, said air cleaner comprising:

a. an outer shell having first and second ends;

b. a tubular filter element located within said outer shell and defining a space therebetween, said filter element having first and second ends and an inner opening;

c. a tubular nozzle element located in said inner opening, having first and second ends, comprising a perforated filter element support portion at said first end, a generally centrally located throat portion, and a noise suppressing portion converging from a nozzle element outlet at said second end to said throat;

d. a first end cap fixed to and forming a fluid-tight junction with each of said first ends;

e. a second end cap affixed to and forming a fluid-tight junction with each of said second ends, said second end cap having an aperture with a periphery aligned with said nozzle element outlet; and f. at least one air intake aperture in said air cleaner located to place said space between said shell and said filter element in fluid communication with air outside the air cleaner.

2. An air cleaner according to claim 1 wherein said throat portion of said tubular nozzle element is cylindrical in shape with an inside opening, said inside opening being generally smaller than said aperture in said second end cap and sized to provide a predetermined level of negative engine crankcase pressure sufficient to promote crankcase ventilation.

3. An air cleaner according to claim 2, wherein said throat portion of said tubular nozzle element is sized to create a mininum negative crankcase pressure of 10.5 inches of water.

4. An air cleaner according to claim 1 wherein said perforated filter element support portion of said tubular nozzle element is cylindrical in shape with an outside diameter, and wherein said outside diameter of said perforated portion is equal to the diameter of said inner opening of said tubular filter element.

5. An air cleaner according to claim 1, wherein the perforations in said perforated filter element support portion of said tubular nozzle element are arranged and configured to prevent pieces of a damaged tubular filter element from entering said tubular nozzle element.

6. An air cleaner according to claim 1 wherein the size of said nozzle element outlet of said tubular nozzle element is generally equal to the size of said aperture in said second end cap.

7. An air cleaner according to claim 1 wherein said nozzle element outlet, said noise suppressing portion and said throat of said tubular nozzle element are constructed and arranged to attenuate engine intake noise passing from the engine through the air cleaner.

8. An air cleaner according to claim 7, wherein said noise suppressing portion is constructed and arranged to provide a predetermined level of convergence angle between said nozzle element outlet and said throat portion.

9. In an engine air cleaner of the type having a filter element with an inner opening, enclosed within an outer shell, two end caps and at least one aperture to allow air to enter between said shell and said filter element, and an aperture to allow clean air to exit said air cleaner from said inner opening of said filter element, the improvement comprising:

means supporting a nozzle element within said inner opening of said filter element, said nozzle element comprising a noise suppressing portion converging away from a nozzle element outlet.

10. An air cleaner according to claim 9, wherein said nozzle element comprises a throat with said noise suppressing portion converging to said throat.

11. An air cleaner according to claim 10, wherein said nozzle element comprises a perforated portion generally located at the opposite end of said nozzle element from said outlet.

12. In an engine air cleaner of the type having a shell, a tubular filter element with an inner opening enclosed within said outer shell, and two end caps and an aperture to allow air to enter between said shell and said filter element, and an aperture to allow clean air to exit said air cleaner from said inner opening of said filter element, the improvement comprising: means supporting a nozzle element within said inner opening of said filter element, said nozzle element comprising a noise suppressing portion converging away from a nozzle element outlet to a generally centrally located throat.

13. In an engine air cleaner of the type having a filter element with an inner opening, enclosed within an outer shell, two end caps and at least one aperture to allow air to enter between said shell and said filter element, and an aperture to allow clean air to exit said air cleaner from said inner opening of said filter element, the improvement comprising:

a tubular nozzle element within said inner opening of said filter element, said nozzle element comprising a filter element support portion, a generally centrally located throat and a noise suppressing portion converging away from the nozzle element outlet to said throat.

14. An air cleaner for use with a rigid engine air intake tube, said air cleaner comprising:

a. a tubular nozzle element having first and second ends, comprising a perforated portion at said first end, an imperforate generally centrally located portion converging to a throat and an imperforate noise suppressing portion converging from the nozzle element outlet at said second end to said throat;

b. a tubular filter element having first and second ends, and an inner opening, said tubular filter element located concentrically around said tubular nozzle element;

c. an outer shell having first and second ends, said outer shell being located concentrically around said tubular filter element and defining a space between said outer shell and said tubular filter element;

d. a first end cap fixed to and forming a fluid-tight junction with each of said first ends;

e. a second end cap affixed to and forming a fluid-tight junction with each of said second ends, said second end cap having an aperture with a periphery aligned with said nozzle element outlet;

f. at least one intake aperture in at least one of said end caps located to place said defined space in fluid communication with air outside the air cleaner; and g. a tubular flange extending from said second end cap at said periphery of said second end cap aperture, adapted to receive the intake tube.

* * * * *

UNITED STATES PATENT AND TRADEMARK OFFICE

CERTIFICATE OF CORRECTION

PATENT NO. : 5,112,372

DATED : May 12, 1992

INVENTOR(S) : Thomas A. Boeckermann, Larry R. Nepsund, John D. Sandkamp

It is certified that error appears in the above-identified patent and that said Letters Patent is hereby corrected as shown below:

Column 2, line 40; "3" should read --2--.

Signed and Sealed this

Fourteenth Day of September, 1993

*Attest:*

BRUCE LEHMAN

*Attesting Officer*

*Commissioner of Patents and Trademarks*